United States Patent Office 3,775,328
Patented Nov. 27, 1973

3,775,328

COMPOSITE SOFT MAGNETIC MATERIALS

Peter A. Denes, 9101 Crestwood Ave. NE., Albuquerque, N. Mex.

No Drawing. Continuation-in-part of application Ser. No. 538,985, Mar. 31, 1966. This application Mar. 23, 1970, Ser. No. 22,041

Int. Cl. C04b *35/26*

U.S. Cl. 252—62.55 19 Claims

ABSTRACT OF THE DISCLOSURE

A composite soft magnetic material containing at least two distinguishable magnetic materials in particulate form; specifically, ferromagnetic particles and ferrimagnetic particles coated with a layer of ferromagnetic material.

This is a continuation-in-part of my copending application, Ser. No. 538,985, filed Mar. 31, 1966, now Pat. No. 3,520,584.

BACKGROUND OF THE INVENTION

(1) Field of the invention

The present application relates generally to magnetic materials and, more specifically, to soft magnetic systems which are composites of ferromagnetic and ferrimagnetic particles.

(2) Description of the prior art

The French Pat. No. 984,544 teaches as early as in 1949 the preparation of magnetic bodies, consisting of mixtures of ferromagnetic alloy powders and ferrite powders, which are characterized by high permeability, high D.C. resistance, and low eddy current losses at high frequencies. Whereas the French patent cited above does not disclose any method for producing such composite systems, subsequent patents teach production by means of sintering and hot pressing. Production by means of sintering results in the presence of a considerable amount of air in the sintered body. The presence of air lowers the permeability of the composite magnetic body, since the permeability of air is 1. The method of hot pressing taught by the prior art, likewise, fails to eliminate the presence of thin layers of nonmagnetic materials such as, for example, air between the ferromagnetic and ferrite particles. This result is due to the fact that metals and alloys do not 'wet" ceramic surfaces such as those of the ferrites. An additional difficulty encountered in the methods known relates to the fact that ferromagnetic metals and ferrites require completely different atmospheres during sintering or hot pressing. If an oxidizing atmosphere is utilized, the ferromagnetic metals oxidize; if a reducing or neutral atmosphere is employed, the ferrites tend to be reduced. Yet a further limitation in the known methods relates to the processing temperature allowable; that is, the processing temperature must be kept below certain levels in order to avoid chemical changes in the constituent materials or potential interactions between them which would lessen or destroy the magnetic properties sought in the composite bodies. The present invention teaches a new method for the production of soft composite magnetic materials; materials which realize the high permeabilities obtainable by such magnetic systems.

SUMMARY OF THE INVENTION

The invention disclosed in my copending application, Ser. No. 538,985, filed Mar. 31, 1966, contemplates the mixture of two distinctly different magnetic materials, such as ferromagnetic particles (e.g., iron and its alloys) and ferrimagnetic particles (e.g., ferrite). The particles of magnetic materials are mixed in such a manner that each of the materials will, after being processed and amalgamated, continue to possess the characteristics it had out of combination; but, in addition, these individual characteristics are complemented by the other material's characteristics. Typically, the invention will involve the uniting of a ferromagnetic or a metallic material and a ceramic or ferrite magnetic material. As pointed out in my above-referenced copending application the term "ferrite" refers to all magnetic mixed oxides which contain iron as a major component. Such ferrite particles may contribute the following properties to the composite body depending on their compositions: very low coercivity, medium saturation magnetization, high resistivity, and for many ferrite compositions, tolerance of a wide range of processing atmosphere up to relatively high temperatures. The ferromagnetic materials contribute the following properties to the composite body: high permeability, high-saturation induction, mechanical strength and plasticity at relatively low temperatures. It should be understood that both the ferrites and the ferromagnetic materials may possess a broad range of characteristics, and that in some cases certain properties of the materials may be the reverse of that listed, or a property of both materials may be the same. The following table lists typical values of such materials at 20° C.:

| | Ferrites | | Ferromagnetic materials | |
|---|---|---|---|---|
| Maximum saturation magnetization | $MnFe_2O_4$ | 4,500 oersteds | Hiperco: 65% Fe, 35% Co. | 24,000 oersteds. |
| Coercivity | $Mn_{0.65}Zn_{0.35}Fe_2O_4$ | 0.2 oersteds | Permalloy<br>Supermalloy | 0.3 oersted.<br>0.02 oersted. |
| Maximum initial permeability | $Ni_{0.3}Zn_{0.7}Fe_2O_4$ | 4,000 | Supermalloy | 100,000. |
| Resistivity | $FeO \cdot Fe_2O_3$<br>$NiFe_{1.9}Mn_{0.02}O_{3.87}$ | $10^{-2}$ ohm cm.<br>$10^{10}$ ohm cm. | Fe alloys | $10^{-5}$ ohm cm. $10^{-4}$ to $10^{-4}$ ohm cm. |

Examples of ferromagnetic materials which may be employed in accordance with the invention disclosed in my copending application, Ser. No. 538,985, filed Mar. 31, 1966, include: iron, iron-nickel alloys, iron-cobalt alloys; the latter two may include as additives to the alloys molybdenum, chromium, vanadium, and copper. Still other ferromagnetic material which may be used are iron-aluminum, iron-aluminum-silicon, iron-silicon alloys and the like.

Examples of ferrites which may be employed in accordance with the invention disclosed in my above-referenced copending application are such mixed ferrites as: nickel-zinc, manganese-zinc, etc., each of which may include additives such as cobalt oxide, cadmium oxide, vanadium oxide, copper oxide, etc.

The identity of the undivided particles should be discoverable in the final solid composite magnetic body by a light or at least an electron microscope. It has been determined that the range of sizes of the distinguishable particles typically falls between 0.1 microns and 50 microns.

As disclosed in my copending application, Ser. No. 538,985, filed Mar. 31, 1966, it is generally desired to employ a process for combining the particulate materials without producing "unwanted" chemical change or reactions between them. "Unwanted chemical change or reactions" as employed in this description is intended to mean that changes in the magnetic or electrical properties of the materials do not occur at all, or do not occur to an extent that such materials in the composite body no longer possess their initial magnetic and electrical properties to a substantial degree.

The present invention, like that disclosed in my copending application, Ser. No. 538,985, filed Mar. 31, 1966, contemplates composite magnetic materials containing ferromagnetic metals and ferrites in particulate form. However, it is an object of the present invention, in addition, to have extremely close contact between the ferromagnetic metal particles and the ferrite particles. To achieve this object the present invention proposes the coating of the ferrite particles with a thin ferromagnetic metal (or alloy) layer prior to the forming of the composite magnetic metals. The ferromagnetic metal (or alloy) used to coat the ferrite particles is not required to be of the same composition as the separate ferromagnetic particles used to form the composite material.

DESCRIPTION OF THE PREFERRED EMBODIMENTS

Preferred embodiments of the present invention are described herein. In one form of the composite soft magnetic material the ferromagnetic metallic particles are initially annealed by methods known in the metallurgy. Then such metallic particles are thoroughly admixed with the coated ferrite particles. Such coating can be accomplished by conventional methods such as autocatalytic chemical plating, also commonly referred to as electroless plating, vacuum sputtering, or plating from gas phase using a gaseous compound of the metal or alloy to be plated. In order to achieve a uniform coating, the magnetic particles in the coating equipment may be kept moving by rotating and/or vibrating the equipment, or by the generation of magnetic pulses by means known in the art. Following this the mixture is preferably hot pressed in a protective atmosphere. During the compression process the metal particles deform readily and fill the voids existing between the coated ferrite particles. The metallicc particles "wet" completely the metalized surfaces of the coated ferrite particles. In addition, at the proper temperature and pressure, the particles tend to weld together to a substantial degree. This method produces an extremely dense composite body which utilizes the basic magnetic properties of the constituents to the utmost degree. Such a composite body has a high electrical resistance due to the interwoven ferrite particles, and it has a relatively high permeability; values typically lie between the permeability of the ferromagnetic particles and that of the ferrite particles.

Typical pressure and temperature parameters related to the method of hot pressing may be as high as 120,000 p.s.i. and 800° C., respectively. Such values of pressure and temperature are severe with respect to the useful life of the die utilized in the process, resulting in a higher cost of production. To mitigate the above-described effects the present invention also proposes a means of lowering the pressure and temperature required to produce composite magnetic bodies, without degradation of their quality. The melting point of most ferromagnetic metals and alloys of high permeability is higher than 1,000° C. This is the reason for the previously cited high pressure and temperature requirement. In a variation of this invention a lower operating temperature is made possible by utilizing a low melting point metal or alloy to coat the ferromagnetic particles and/or the ferromagnetic coating previously applied to the ferrite particles. The resulting bond between such coated particles is similar to a soldering or brazing action; further, the soldering or brazing action is promoted by the simultaneous application of pressure. A difficulty arises due to the fact that practically all metals and alloys which melt at temperatures below 1,000° C. are not ferromagnetic. The presence of such a non-magnetic phase in the composite bodies would lower their permeability. Consequently, this invention teaches that the low melting point metals and alloys selected to coat the constituent particles must be only those which can be "diffusion alloyed" by heat treatment, to the ferromagnetic metallic or alloy particles and/or to the ferromagnetic metallic (or alloy) coating on the ferrite particle; the reason being that such diffusion alloying yields alloys which are all ferromagnetic. The utilization and subsequent elimination of the non-magnetic phase by this method yields composite bodies of high permeability at relatively low operating temperatures. Examples of such low melting point non-ferromagnetic metals and alloys which can be diffusion alloyed up to a maximum percentage with iron, nickel, cobalt, etc. (and their alloys) to form ferromagnets are tin, cadmium, lead, bismuth, copper, zinc, silver, etc., and their alloys.

The coating of the ferromagnetic particles and/or the ferromagnetic coating on the ferrite particles by such low melting point metals or alloys may be accomplished by means of autocatalytic chemical plating, electrolytical plating, vacuum sputtering, plating from gas phase using a gaseous compound of the low melting point metals or alloys, etc., or by combinations of the above methods. To promote the uniformity of the coating, one or more of the following methods can be employed to keep the magnetic particles moving: rotation, vibration of the coating equipment, magnetic pulses, etc.

The hot pressing of such magnetic bodies may be carried out at temperatures between 100° C. and 600° C., depending on the employed non-magnetic metal or alloy. The applied pressures may also be reduced to magnitudes between 20,000 p.s.i. and 100,000 p.s.i., depending on the properties of the employed non-magnetic metal or alloy. The temperature which is applied to start the diffusion alloying may be substantially close to the melting point temperature of the non-magnetic metal or alloy used. As the diffusion progresses, the melting points of the newly generated alloys increase. Consequently, the temperature of the heat treatment may be increased in order to accelerate the completion of a relatively uniform alloying. Typical operating temperatures for such heat treatment are between 100° C. and 700° C., depending on the properties of the materials involved in the diffusion alloying.

It should be understood that it is within the scope of the invention to employ exclusively pressure or exclusively heat to form the composite body without the "unwanted chemical changes or reactions." This use of heat alone is appropriate in instances where the particular constituents are insensitive to high temperatures. For example, such a method may involve sintering without pressure at 1300° C. with heating, soaking and cooling taking place in a nitrogen atmosphere. The use of pressure alone requires some high-pressure technique such as explosive compacting or hydraulic pressing. Explosive compacting, for example, can produce pressures up to 1,000,000 p.s.i. and higher. Generally, when pressure alone is applied, the required pressure is greater than 100,000 p.s.i. Other methods which are within the scope of the invention involve repeated pressing and annealing and sintering.

The present invention and its preferred embodiments will be better understood in the light of the six examples which follow:

EXAMPLE I

The ferromagnetic composition employed is an alloyed powder consisting of 80 percent (80%) by weight nickel and 20 percent (20%) by weight iron. The average particle size of the ferromagnetic nickel-iron powder is 3 microns. The ferromagnetic powders are previously heat treated at 750° C. in a hydrogen atmosphere to render them soft and easily deformable.

The ferrite composition is 51 mol percent $Fe_2O_3$, 37 mol percent MnO and 12 mol percent ZnO, completely prereacted. Its average particle size is 1 micron. The ferrite powders are first coated with a 0.1 micron thick layer of an alloy of 80 percent (80%) by weight nickel and 20 percent (20%) by weight iron, utilizing an autocatalytic chemical plating process known in the art. The coated ferrite particles are heat treated at 350° C. in an atmosphere consisting of 30 percent (30%) hydrogen and 70 percent (70%) nitrogen to deoxidize the surface of the ferromagnetic coating. This temperature is low enough not to reduce the ferrite powders.

30 percent (30%) by weight of the ferromagnetic powders are thoroughly mixed with 70 percent (70%) by weight of the coated ferrite particles. The mixture is hot pressed at 500° C., and 40,000 p.s.i., in a nitrogen atmosphere. During the compression, the soft magnetic particles deform and fill up the voids between the coated ferrite particles. At the same time, partial welding occurs between the ferromagnetic particles and the ferromagnetic coatings of the ferrite particles, reducing, thereby, the volume percentage of the only non-magnetic component, air, to less than one percent (1%). The pressed body is annealed at 600° C. in nitrogen and cooled down slowly at a rate of 10° C. per minute. The permeability of the composite body is 18,000 and its saturation induction is 7500 gauss.

EXAMPLE II

The ferromagnetic particles are the same as in Example I. The ferrite particles are completely prereacted and of the following composition: 50 mol percent $Fe_2O_3$, 5.5 mol percent NiO, 23.5 mol percent ZnO, 16 mol percent MgO and 5 mol percent CuO. Their average particle size is 2 microns. The ferrite powders are coated by autocatalytic chemical plating with a 0.15 micron thick layer of an alloy of 80 percent (80%) by weight nickel and 20 percent (20%) by weight iron. The coated ferrite particles are then electroplated, e.g., in a barrel plating operation, with a 0.01 micron thick layer of tin. The ferromagnetic particles are also plated with a 0.01 micron thick layer of tin.

40 percent (40%) by weight of the coated ferrite particles are thoroughly mixed with 60 percent (60%) by weight of the plated ferromagnetic particles. The mixture is hot pressed at 250° C. with a pressure of 60,000 p.s.i. After the compression, the bodies are heat treated in nitrogen at 250° C. for 12 hours and at 400° C. for an additional 12 hours to cause the tin atoms to diffuse into the nickel-iron alloy, forming ferromagnetic nickel-iron-tin alloys. Following this, the bodies are repressed at 250° C. and 60,000 p.s.i. This results in further densification as the alloy particles become softer and more plastic during the long time, low temperature heat treatment. A final vacuum treatment at 600° C., combined with a slow cooling, increases the permeability of the composite body to 15,000.

EXAMPLE III

The composition of the ferromagnetic particles is 85 percent (85%) by weight iron, 5 percent (5%) by weight aluminum and 10 percent (10%) by weight silicon. Their average particle size is 3 microns. They are electroplated with a 0.02 micron thick cadmium layer. The ferrite particles are the same as in Example II. The ferrite particles are coated with a 0.1 micron thick iron layer, and then with a 0.01 micron cadmium layer. 50 percent (50%) by weight of both particle types are thoroughly mixed and pressed at 350° C. with a pressure of 50,000 p.s.i. The diffusion alloying heat treatment is 12 hours at 350° C. followed by 18 hours at 500° C. in an atmosphere containing 30 percent (30%) hydrogen and 70 percent (70%) nitrogen. The permeability of the composite body is 12,000.

EXAMPLE IV

Ferromagnetic particles of the composition 81 percent (81%) be weight nickel, 16 percent (16%) by weight iron and 3 percent (3%) by weight molybdenum have an average particle size of 5 microns. These particles are previously annealed at 800° C. in hydrogen. The composition of the ferrite particles is 53 mol percent $Fe_2O_3$, 30 mol percent MnO, 8 mol percent NiO and 9 mol percent ZnO. The average particle size of the ferrite powders is 2 microns. The ferrite particles are coated autocatalytically with a 0.05 micron thick layer of an alloy of the composition of 80 percent (80%) by weight of nickel and 20 percent (20%) by weight of iron. The coated powders are then electroplated with a 0.15 micron thick alloy layer of the composition of 81 percent (81%) by weight nickel, 16 percent (16%) by weight iron and 3 percent (3%) by weight molybdenum.

50 percent (50%) by weight of the ferromagnetic powders are thoroughly mixed with 50 percent (50%) by weight of the coated ferrite particles. The mixture is hot pressed at 600° C. and with a pressure of 75,000 p.s.i. in a protective atmosphere of 80 percent (80%) nitrogen and 20 percent (20%) hydrogen. The pressed bodies are annealed at 700° C. in vacuum, combined with a slow cooling off. The permeability of the composite body after heat treatment is 25,000. This can be slightly increased if after the last heat treatment, a second hot pressing operation and a second vacuum annealing is added.

The coating of the ferrite particles with both an alloy of nickel and iron (autocatalytically) and an alloy of nickel, iron and molybdenum (electrolytically) as disclosed above in Example IV, is proposed for the following reasons:

(a) the higher permeability iron-nickel-molybdenum alloy cannot be deposited by an autocatalytic chemical plating; and, (b) the chemically reduced iron, iron-nickel coatings always contain a small amount of phosphorus, due to the presence of hypophosphite reducing agents. The surface of such a coating is more prone to oxidation than is the surface achieved by electroplating a layer of a pure alloy, such as iron-nickel-molybdenum.

EXAMPLE V

The ferromagnetic and ferrite particles are the same as in Example I. The coating of the ferrite particles is performed by plating from gas phase. For that purpose, the ferrite powders are placed in a heatable and rotatable vacuum chamber. The chamber is rotated at a rate of 100 revolutions per minute in order to expose all the surfaces of the ferrite particles to the plating process. For the same purpose, a vertical magnetic pulse is generated every 5 seconds to lift the ferrite particles. The vacuum chamber is filled with 1000 grams of ferrite, 255 grams hexamminenickel (II) iodide, and 45 grams hexamminecobalt (II) iodide. After the chamber is evacuated, it is heated up to 450° C. At this temperature the nickel and cobalt complexes decompose, and the ferrite particles are plated with an alloy of approximately 85 percent (85%) by weight nickel and 15 percent (15%) by weight cobalt. The rest of the operation may be identical with that in Example I.

EXAMPLE VI

The ferromagnetic and ferrite particles are the same as in Example IV. The coating of the ferrite particles is performed by vacuum sputtering. For that purpose, the ferrite powders are placed in a rotatable vacuum sputtering device which is simultaneously rotated and vibrated at a frequency of 200 cycles per second. The evaporated composition is identical with the composition of the ferromagnetic powders; e.g., 81 percent (81%) by weight nickel, 16 percent (16%) by weight iron and 3 percent (3%) by weight molybdenum. The ferromagnetic particles are mixed with the vacuum coated ferrite particles in a ratio of 60 percent (60%) to 40 percent (40%) by weight. The mixture is hot pressed at 600° C. with a pressure of 80,000 p.s.i.; it is then annealed at 700° C. in a vacuum. The permeability of the composite body after heat treatment is 28,000.

While the preferred embodiments and specific examples disclosed above deal with only one ferrite and one ferromagnetic metal or alloy, it should be understood that the present invention contemplates a composite soft magnetic material containing one or more ferrite types and one or more ferromagnetic types whenever special magnetic properties are sought.

The basic principles disclosed herein relative to composite soft magnetic materials and the method of forming them are susceptible of numerous applications which will be apparent to persons skilled in the art. Therefore, the specific examples given and cited hereinabove are to be considered as only illustrative of some preferred embodiments of the present invention; and the invention is not intended to be limited thereto.

I claim:

1. The method of producing a composite soft magnetic body comprising the steps of:
   (a) providing at least one soft magnetic ferrite material in particulate form;
   (b) coating said ferrite particulate with at least one soft magnetic metallic material;
   (c) providing at least one soft magnetic metalic material in particulate form;
   (d) admixing said particulate materials; and
   (e) forming a solid body of said admixed materials whereby the magnetic properties of said materials in particulate form are substantially preserved.

2. The method of claim 1 in which at least one of said soft particulate magnetic metallic materials is an alloy.

3. The method of claim 1 in which at least one of said soft magnetic coating materials is an alloy.

4. The method of claim 1 in which the coating of said ferrite by said soft magnetic metallic material is by means of autocatalytic chemical plating.

5. The method of claim 1 in which the coating of said ferrite by said soft magnetic metallic material is by means of vacuum sputtering.

6. The method of claim 1 in which the coating of said ferrite by said soft magnetic metallic material is by means of plating from gas phase using a gaseous compound of said soft magnetic metallic material.

7. The method of claim 1 in which said coated ferrite particles are further coated with a soft magnetic metallic material by means of electroplating.

8. The method of claim 1 in which the coating of said ferrite by said soft magnetic metallic material is by means of a combination of autocatalytic chemical plating and electroplating.

9. The method of claim 1 in which the coating of said ferrite by said soft magnetic metallic material is by means of a combination of vacuum sputtering and electroplating.

10. The method of claim 1 in which the coating of said ferrite by said soft magnetic metallic material is by means of a combination of gas phase plating and electroplating.

11. The method of claim 1 in which the coating of said ferrite material with said soft magnetic metallic material occurs inside coating equipment which is being rotated, thereby, keeping the particles of said ferrite material in motion and improving uniformity of the coating.

12. The method of claim 1 in which the coating of said ferrite material with said soft magnetic metallic material occurs inside coating equipment which is being vibrated, thereby, keeping the particles of said ferrite material in motion and improving the uniformity of the coating.

13. The method of claim 1 in which the coating of said ferrite material with said soft magnetic metallic material occurs while said ferrite material is exposed to intermittent magnetic pulses, thereby, keeping the particles of said ferrite material in motion and improving the uniformity of the coating.

14. The method of claim 1 in which said solid body is formed by the application of heat.

15. The method of claim 14 in which the temperature used is between 1,000° C. and 1,300° C.

16. The method of claim 1 in which said solid body is formed by the application of pressure.

17. The method of claim 16 in which the pressure applied is between 100,000 p.s.i. and 1,000,000 p.s.i.

18. The method of claim 1 in which said solid body is formed by a combination of heat and pressure.

19. The method of claim 18 in which the temperature and pressure ranges are from 500° C. to 800° C. and from 40,000 p.s.i. to 120,000 p.s.i., respectively.

References Cited

UNITED STATES PATENTS

| | | | |
|---|---|---|---|
| 2,575,099 | 11/1951 | Crowley | 252—62.55 |
| 2,734,034 | 2/1956 | Crowley | 252—62.55 |
| 3,116,255 | 12/1963 | Meiklejohn | 252—62.55 |

FOREIGN PATENTS

| | | | |
|---|---|---|---|
| 437,126 | 10/1935 | Great Britain | 252—62.55 |
| 750,537 | 6/1956 | Great Britain | 148—101 |
| 805,710 | 12/1958 | Great Britain | 252—62.55 |
| 984,544 | 2/1951 | France | 252—62.55 |
| 1,037,351 | 8/1958 | Germany | 252—62.55 |

OSCAR R. VERTIZ, Primary Examiner

J. COOPER, Assistant Examiner